United States Patent
Schäfer et al.

(10) Patent No.: US 11,597,437 B2
(45) Date of Patent: Mar. 7, 2023

(54) METHOD FOR OPERATING A STEERING SYSTEM

(71) Applicant: Volkswagen Aktiengesellschaft, Wolfsburg (DE)

(72) Inventors: Johannes Maria Schäfer, Werben (DE); Björn Makkus, Braunschweig (DE); Dirk Dreyer, Stadthagen (DE); Andreas Pöhland, Gifhorn (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 268 days.

(21) Appl. No.: 16/891,540

(22) Filed: Jun. 3, 2020

(65) Prior Publication Data
US 2020/0385055 A1    Dec. 10, 2020

(30) Foreign Application Priority Data
Jun. 5, 2019    (DE) .................... 10 2019 208 201.7

(51) Int. Cl.
*B62D 15/02*    (2006.01)

(52) U.S. Cl.
CPC ....... *B62D 15/0265* (2013.01); *B62D 15/029* (2013.01)

(58) Field of Classification Search
CPC .. B62D 15/0265; B62D 15/029; B62D 5/006; B62D 6/008; B62D 1/181; B62K 21/00
See application file for complete search history.

(56) References Cited

U.S. PATENT DOCUMENTS

| | | | |
|---|---|---|---|
| 6,571,176 B1 | 5/2003 | Shinmura et al. | 701/301 |
| 6,612,393 B2 | 9/2003 | Bohner et al. | 180/405 |
| 9,037,352 B2 | 5/2015 | Harder et al. | 701/42 |
| 2004/0148080 A1 | 7/2004 | Ekmark et al. | 701/41 |
| 2004/0187600 A1 | 9/2004 | Moriguchi | 73/862.27 |
| 2006/0201733 A1 | 9/2006 | Dominke et al. | 180/402 |
| 2008/0087491 A1 | 4/2008 | Ammon et al. | 180/426 |

(Continued)

FOREIGN PATENT DOCUMENTS

| | | | |
|---|---|---|---|
| DE | 10159330 A1 | 7/2002 | ............. B62D 5/00 |
| DE | 10221721 A1 * | 11/2003 | ........... B62D 5/0469 |

(Continued)

OTHER PUBLICATIONS

Machine Translation of DE10221721A1 (Year: 2002).*
German Office Action, Application No. 102019206201.7, 5 pages.

*Primary Examiner* — Rachid Bendidi
*Assistant Examiner* — Andrew J Cromer
(74) *Attorney, Agent, or Firm* — Slayden Grubert Beard PLLC

(57) ABSTRACT

A method for operating a steering system of a vehicle, wherein an actuator is provided for generating a moment at a steering handle of the vehicle, wherein the following steps are carried out: generating the moment up to a maximum moment if the maximum moment is enabled, and up to a lower limited moment if the maximum moment is limited, identifying a vehicle situation of the vehicle, enabling the maximum moment if the vehicle situation is identified as being a boarding and/or deboarding situation in order to brace the steering handle, and limiting the maximum moment if the vehicle situation is identified as being driving operation of the vehicle.

19 Claims, 1 Drawing Sheet

(56) References Cited

U.S. PATENT DOCUMENTS

| | | | |
|---|---|---|---|
| 2008/0249685 A1 | 10/2008 | Hara et al. | ............... 701/42 |
| 2009/0032328 A1* | 2/2009 | Wong | ............ B62J 45/411 |
| | | | 180/444 |
| 2019/0092376 A1 | 3/2019 | Panse et al. | |
| 2020/0239061 A1* | 7/2020 | Zheng | ............ B62D 6/008 |
| 2021/0229742 A1* | 7/2021 | Nakamura | ......... B62D 15/025 |

FOREIGN PATENT DOCUMENTS

| | | | |
|---|---|---|---|
| DE | 102006056042 A1 | 5/2008 | ............ B60R 25/02 |
| DE | 102010004576 A1 | 12/2010 | ............ B62D 5/04 |
| DE | 102018123241 A1 | 3/2019 | ............ B62D 5/00 |
| DE | 102020100789 A1 | 7/2020 | ............ B62D 5/04 |
| GB | 2435912 A | 9/2007 | ............ B62D 5/04 |
| WO | 2007/049444 A1 | 5/2007 | ............ B62D 5/04 |

\* cited by examiner

METHOD FOR OPERATING A STEERING SYSTEM

CROSS-REFERENCE TO RELATED APPLICATIONS

This application claims priority to German Patent Application No. DE 10 2019 208 201.7, filed on Jun. 5, 2019 with the German Patent and Trademark Office. The contents of the aforesaid patent application are incorporated herein for all purposes.

TECHNICAL FIELD

The present invention relates to a method for operating a steering system. The invention further relates to a safety system and to a computer program.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

It is known from the prior art to use an additional actuator in steering systems of vehicles that applies a restoring moment to a steering wheel. This can also be referred to as a force-feedback steering wheel. In this way, driving comfort is increased, in particular in steer-by-wire steering systems. In steer-by-wire steering systems, the steering command is transmitted electrically. Accordingly, a mechanical coupling may not be provided between the steering wheel and the steering gear. This therefore creates high safety requirements for the functions of a steering system of this kind.

It can be technically complex to implement these higher safety requirements for the actuator and/or the force-feedback steering wheel. In particular, it may be necessary to prevent excessively high moments during driving operation that could lead to dangerous operating situations.

Generic methods and/or systems are known from DE 101 59 330 A1, U.S. Pat. No. 6,571,176 B1 and U.S. Pat. No. 9,037,352 B2.

SUMMARY

An object of the present invention is to overcome the above-described disadvantages at least in part.

The above-mentioned object is solved by a method, a safety system, and by a computer program according to the independent claims. Embodiments of the invention are discussed in the dependent claims and the following description.

In one exemplary aspect, a method for operating a steering system of a vehicle is provided, wherein an actuator is provided for generating a moment at a steering handle of the vehicle. The exemplary method comprises:
  generating the moment up to a maximum moment if the maximum moment is enabled, and up to a lower limited moment if the maximum moment is limited;
  identifying a vehicle situation of the vehicle;
  enabling the maximum moment if the vehicle situation is identified as being one or more of a boarding and deboarding situation in order to brace the steering handle; and
  limiting the maximum moment if the vehicle situation is identified as being driving operation of the vehicle.

The details of one or more embodiments are set forth in the accompanying drawings and the description below. Other features will be apparent from the description, drawings, and from the claims.

DESCRIPTION

Figure 1:
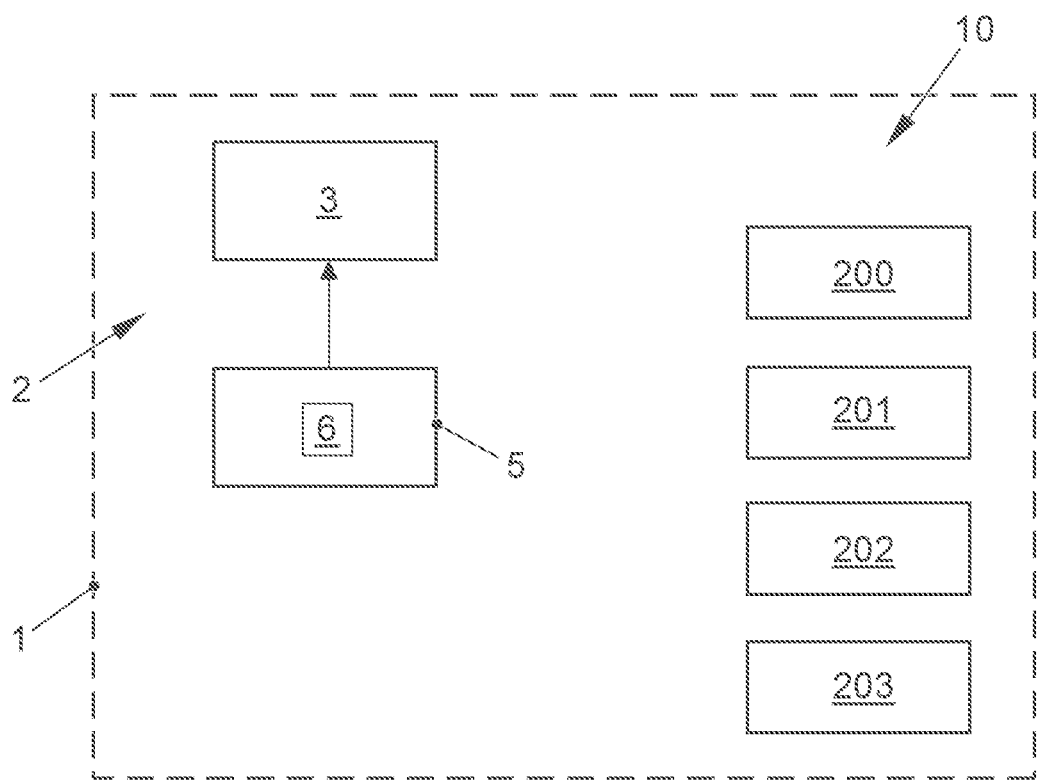
FIG. 1 is a schematic representation of a safety system.

Specific embodiments of the invention are described in detail, below. In the following description of embodiments of the invention, the specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

It is noted that embodiments, features, and details that are described in the following in connection with a method according to a first exemplary aspect also apply to a safety system according a further exemplary aspect, as well as to a computer program according to a further exemplary aspect and vice versa. Therefore, reference is or can be made interchangeably to the individual aspects in the disclosure thereof.

An actuator (in the following also referred to as steering handle actuator or steering wheel actuator) may be provided for generating a moment, e.g., a torque or steering moment, at a steering handle of the vehicle.

In some embodiments, the steering handle (e.g., in the form of a steering wheel of the vehicle or the like) is designed to provide a steering command. The steering command may be transmitted electrically if the steering system is designed as a steer-by-wire steering system. In steering systems of this kind, there is often no mechanical coupling between the steering handle and the steering gear, and therefore restoring forces cannot be transmitted via said coupling to the steering handle. Therefore, in order to achieve a comparable feel, it may be expedient for the moment to be generated by the actuator in order to reset the steering handle. Other convenience functions that may be provided by generating the moment are also conceivable. In some embodiments, one possible convenience function may be a boarding aid, which is made possible by bracing (locking) the steering handle. However, higher maximum moments are required for this than for resetting the steering handle. The actuator must be designed accordingly to provide said higher moments. However, it is beneficial to ensure that said higher maximum moments do not negatively affect driving operation.

According to a first exemplary aspect, the following steps may be carried out, e.g., in any desired order and/or also so as to overlap temporally at least in part:
  generating the moment up to a maximum moment if the maximum moment is enabled, and up to a lower limited moment if the maximum moment is limited,
  identifying a vehicle situation of the vehicle, enabling the maximum moment if the vehicle situation is identified as being a boarding and/or deboarding situation in order to brace the steering handle, limiting the maximum moment if the vehicle situation is identified as being driving operation of the vehicle.

In other words, if the maximum moment is enabled, the moment may also correspond at most to said maximum moment, i.e., may be increased up to said maximum moment. This is expedient, for example, if the steering handle needs to be braced (locked) in order to serve as a boarding aid, for example. However, during normal driving operation of the vehicle, this maximum moment poses a potential danger, e.g., if the moment should be increased to the maximum moment due to a malfunction. Therefore, the additional limitation of the maximum moment is of benefit if the vehicle situation is identified as being driving operation of the vehicle. For example, the vehicle situation is always identified as being driving operation if the boarding and/or deboarding situation has not been identified and/or if the ignition is activated and/or the driving speed is greater than 0.

In some embodiments, the moment may beneficially be increased at most up to the limited moment if the maximum moment is limited. The limited moment is for example 5% to 50%, e.g., 15% to 40%, or, e.g., 20% to 30%, and/or, e.g., 50% of the maximum moment. As a result, safety during driving operation is increased significantly.

The function and/or the computer program (according to a further exemplary aspect) for limiting the maximum moment may take precedence over the other functions for generating the moment. The function and/or the computer program may also be developed with a very high safety integrity in some embodiments. This ensures that the limiting function is always active, e.g., even if there is a fault with the steering system.

In some embodiments, the boarding and/or deboarding situation is identified in order to permit high moments at the steering handle. However, it is also possible in some embodiments to limit the moment to an overridable level outside of said boarding and/or deboarding situation, for example after leaving said boarding and/or deboarding situation. In other words, the maximum moment may be limited even if the actuator is in principle designed to generate said maximum moment. The actuator is, for example, an electric motor that exerts the moment on the steering handle in the form of a torque and/or steering moment. It is possible for the high maximum moments to only be permitted during boarding and/or deboarding. It is therefore ensured that the moments may be overridden by the driver at any time during driving operation, and therefore no critical driving states arise.

Furthermore, within the scope of the present discussion, as soon as the moment reaches the maximum moment during normal operation (driving operation) and/or the limited moment is exceeded, the moment may be limited or the actuator can be switched off.

Moreover and in some embodiments, a manual moment that the driver applies to the steering handle may be evaluated. For example, if said manual moment lasts longer at a specific minimum value and/or if a very high manual moment gradient is observed, the moment of the actuator is reduced or completely switched off as required.

In some embodiments, the boarding and/or deboarding situation is identified in that at least one requirement is detected. For example, the at least one requirement may include the detection of a deactivated readiness to drive and/or a deactivated ignition of the vehicle engine and/or an open position of a door and/or hatch of the vehicle. Optionally and in some embodiments, all of the requirements have to be detected cumulatively in order to identify the boarding and/or deboarding situation. This way, it can be ensured that the vehicle is not actually driven or should not be driven. On the other hand, a driving operation may be identified if an activated readiness to drive and/or activation of the ignition and/or a closed position of the door and/or hatch is detected in the vehicle. The readiness to drive is communicated by a control unit of the vehicle, for example via a bus system, such as a CAN bus system, and may be read out accordingly for the aforementioned detections.

In some embodiments, the vehicle is designed as a motor vehicle, for example a trackless land motor vehicle, for example a hybrid vehicle that comprises an internal combustion engine and an electric machine for the traction, or as an electric vehicle, e.g., having a high-voltage on-board power supply and/or an electric motor. For example, the vehicle may be designed as a fuel cell vehicle and/or passenger car. For example, in the case of embodiments of electric vehicles, no internal combustion engine is provided in the vehicle, which is then driven exclusively by means of electrical energy.

The steering handle is for example designed as a steering wheel that a driver of the vehicle uses to control the vehicle and in particular to communicate the steering command.

In order to communicate the steering command, a driver may for example apply a torque (manual moment) to the steering handle. In this case, the steering handle may for example be arranged in the front of the vehicle interior so as to be accessible to the driver during driving operation, i.e., during movement of the vehicle.

Furthermore and in some embodiments, the steering handle is designed as a force-feedback (haptic) steering handle, such as a steering wheel. For this purpose, an actuator, also referred to as a force-feedback actuator or steering handle actuator, may be used. Said actuator may be designed to apply a moment to the steering handle. This way, the actuator may convey to the driver the steering sensation and/or the haptics also provided in a mechanically driven steering system. If, for example, the driver operates the steering handle, i.e., a torque is applied to the steering handle, the actuator generates the moment as a restoring moment, which counteracts the torque produced by the driver (i.e. manual moment). Moreover, the moment generated by the actuator can be used to lock, i.e., brace, the steering handle. For this purpose, a moment of at least 40 Nm or at least 60 Nm or at least 80 Nm, for example, is used in corresponding embodiments.

The force-feedback actuator may for example be designed as an electric motor. In some embodiments, this electric motor may be directly coupled to the steering column in order to apply a moment to the steering handle. It is also possible for the rotor of the electric motor to be designed as the steering shaft, and thus the steering shaft is driven directly.

Furthermore and in some embodiments, it is possible for the moment to be generated up to the limited moment as a restoring moment, which counteracts the torque produced by a driver (manual moment), for example in order to influence a sensation for the driver during steering of the vehicle.

In some embodiments, the limited moment may be designed that a driver or the manual moment may override the limited moment, and/or the maximum moment may be such that overriding is prevented. Accordingly, it may be possible for the limited moment to be smaller than a typical manual moment, or it may be set to the same order of magnitude as the manual moment. In contrast, the maximum moment may be significantly larger than the typical manual moment.

In some embodiments, the maximum moment is at least 40 Nm or at least 60 Nm or at least 80 Nm, and the limited moment is at most 20 Nm or at most 10 Nm or at most 8 Nm. For example, the maximum moment is in the range of 40 Nm to 100 Nm, e.g., 60 Nm to 80 Nm. The limited moment may for example be in the range of 1 Nm to 30 Nm, e.g., 2 Nm to 20 Nm, or, e.g., 3 Nm to 10 Nm.

In some embodiments, the identification of the vehicle situation comprises at least one of the following steps:
  detecting a deactivated readiness to drive of the vehicle,
  detecting a deactivated ignition of an engine of the vehicle,
  detecting a standstill of the vehicle based on a travel speed,
  detecting an open position of a door and/or hatch of the vehicle,
in each case in order to identify the vehicle situation as a boarding and/or deboarding situation. The detections may also have to be carried out cumulatively in order for the boarding and/or deboarding situation to be identified.

In some embodiments, the actuator, e.g., in the form of an electric motor, may comprise redundant windings, e.g., at least or exactly 6 windings, the maximum moment may for example be enabled in that all windings are used to generate the moment, and/or the maximum moment may for example be limited in that only some of the windings, e.g., half, are used to generate the moment. This way, it is possible to limit the maximum moment to the limited moment in a safe and reliable manner.

Moreover and in some embodiments, it may be possible for one half of the windings to be switched over to the second half in the event of a fault with the steering system and/or actuator, such that the redundancy results in continued availability of the actuator. In other words, the first half, which was used until that point to generate the moment, is deactivated, and the second half, which was deactivated until that point, is activated and thus used to generate the moment.

In some embodiments, the steering system is designed as a steer-by-wire steering system.

A "steer-by-wire" steering system is understood to mean a steering system in which the steering command is transmitted electrically. Specifically, the steering command is forwarded electrically by the steering handle to the electromechanical actuator, e.g., the road wheel actuator or wheel positioning actuator, which then executes the steering command. In other words, in a steering system of this kind, no mechanical connection may be provided between the steering handle and the steering gear and/or steered wheels during normal operation. Specifically, in normal cases, it is for example possible to dispense with the mechanical connection between the steering handle and the tie rod via the steering column.

A further exemplary aspect relates to a safety system for a steering system of a vehicle, comprising:
  an actuator, such as an electric motor, for generating a moment at a steering handle, such as a steering wheel, of the vehicle up to a maximum moment if the maximum moment is enabled, and up to a lower limited moment if the maximum moment is limited,
  an identification device for identifying a vehicle situation of the vehicle,
  an enabling device for enabling the maximum moment if the vehicle situation is identified as being a boarding and/or deboarding situation in order to brace the steering handle, and
  a limiting device for limiting the maximum moment if the vehicle situation is identified as being driving operation of the vehicle.

It is noted that the safety system according to the present aspect produces the same benefits as those described in detail with reference to the method explained in the preceding with reference to the first aspect. In addition, the safety system may be suitable for carrying out the steps of the method as discussed in the preceding or any of the discussed embodiments.

The identification device may for example comprise at least one processor, such as a microcontroller, and/or a sensor, and/or at least one signal input in order to identify the vehicle situation. An electric signal of the sensor and/or a message, for example, that induces the readiness to drive of the vehicle can be received via the signal input. For this purpose, the signal input may for example be designed as part of a CAN (Controller Area Network) bus interface in order to receive the message as a CAN message. At least one sensor of the identification device may for example identify an open position or a closed position of a hatch, such as a door, of the vehicle and/or an activated or deactivated ignition and/or a speed of the vehicle.

The identification device and/or the enabling device and/or the limiting device may each also be part of the electronics of the safety system or part of a computer program. For example, the enabling and/or limiting device may be designed to influence and/or monitor control and/or regulation of the actuator. Functionally, the identification device and/or the enabling device and/or the limiting device may take precedence over other functions for controlling and/or regulating the actuator. In other words, control commands of said devices may have a higher priority than those of the other functions. This ensures that, even in the event of a fault (e.g., in the event of a fault with said functions), the moment can still be limited by the limiting device. For this purpose, the limiting device may also be developed having a higher safety integrity than the other functions.

According to another exemplary aspect, a computer program, in particular a computer program product, is provided for operating a steering system of a vehicle, for example for operating an actuator of the steering system and/or a safety system as discussed herein. In this regard, the steering system comprises the actuator for generating a moment at a steering handle of the vehicle, the computer program comprising commands which, when executed by a processing device such as microcontroller and/or processor and/or the like, prompt same to carry out the following steps:
  identifying a vehicle situation of the vehicle,
  enabling the generation of the moment up to a maximum moment (for example such that the moment also corresponds to the maximum moment for at least a short time) if the vehicle situation is identified as being a boarding and/or deboarding situation in order to brace the steering handle,
  limiting the generation of the moment to a limited moment that is lower than the maximum moment (for example such that the moment absolutely does not correspond to the maximum moment) if the vehicle situation is identified as being driving operation of the vehicle.

The before mentioned computer program produces the same benefits as those described in detail with reference to the method according to the first aspect. In addition, the computer program may be suitable for carrying out the method according to the first aspect or any of its embodiments.

Reference will now be made to the drawings in which the various elements of embodiments will be given numerical designations and in which further embodiments will be discussed.

Specific references to components, process steps, and other elements are not intended to be limiting. Further, it is understood that like parts bear the same or similar reference numerals when referring to alternate FIGS. It is further noted that the FIGS. are schematic and provided for guidance to the skilled reader and are not necessarily drawn to scale. Rather, the various drawing scales, aspect ratios, and numbers of components shown in the FIGS. may be purposely distorted to make certain features or relationships easier to understand.

FIG. 1 shows a safety system 10 for a steering system 2 of a vehicle 1. Said safety system may comprise an actuator 5, which is used to generate 101 a moment at a steering handle 3 of the vehicle 1 up to a maximum moment if the maximum moment is enabled. In other words, the moment cannot exceed the maximum moment. For this purpose, the actuator 5 is for example designed as an electric motor that exerts the moment on the steering handle 3 in the form of a torque and/or steering moment. The steering handle 3 is for example designed as a steering wheel 3 and may serve as a boarding and deboarding aid, provided that the maximum moment for locking the steering handle 3 or steering wheel 3 is being applied. However, said maximum moment should be limited for regular use of the steering handle 3 in order to prevent locking of the steering handle 3. Accordingly, the actuator 5 is also designed to generate the moment (only) up to a limited moment that is less than the maximum moment if the maximum moment is limited. In other words, the moment cannot exceed the limited moment. For the purpose of said limiting procedure, a limiting device 203 may be provided, for example as part of control software and/or electronics.

This limiting procedure for the maximum moment may be used depending on a vehicle situation of the vehicle 1. For this purpose, an identification device 201 may be provided for identifying 102 said vehicle situation. As a result, a boarding and/or deboarding situation can be identified, i.e., a situation in which the driver of the vehicle 1 would like to get in or get out. This situation may be characterized in that the vehicle 1 is at a standstill. This may potentially be detected by the identification device 201 as one option for simple identification of the boarding and/or deboarding situation. In the event of positive identification of the boarding and/or deboarding situation, an enabling device 202 may then be used to enable 103 the maximum moment in order to brace (i.e. lock) the steering handle 3. On the other hand, if the vehicle situation is identified as being driving operation of the vehicle 1, a limiting device 203 may be provided for limiting 104 the maximum moment.

The actuator 5 may also comprise redundant windings 6, in particular at least 6 windings 6, the maximum moment being enabled 103 in that all windings 6 are used to generate 101 the moment, and the maximum moment being limited 104 in that only some of the windings 6, e.g., half, are used to generate 101 the moment.

Figure 2:
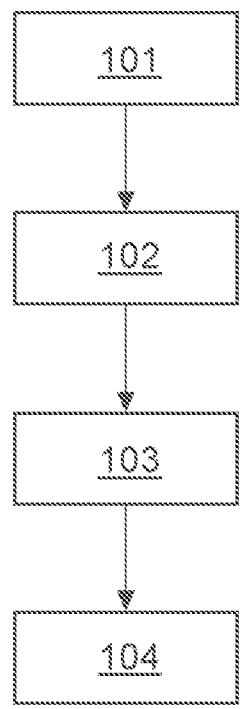
FIG. 2 is a schematic representation for visualizing a method and computer program.

FIG. 2 visualizes a method for operating a steering system 2 of a vehicle 1. Furthermore, the visualization of the method steps also serves to represent a computer program. In the method, an actuator 5 is used to generate a moment at a steering handle 3 of the vehicle 1. Moreover, according to a first method step 101, the moment is generated up to a maximum moment if the maximum moment is enabled, and up to a lower limited moment if the maximum moment is limited. According to a second method step 102, a vehicle situation of the vehicle 1 is identified. As the third method step 103, the maximum moment is enabled if the vehicle situation is identified as being a boarding and/or deboarding situation in order to brace the steering handle 3. The fourth method step 104 comprises limiting the maximum moment if the vehicle situation is identified as being driving operation of the vehicle 1.

The description of the embodiments given above describes the present invention exclusively within the scope of examples. Of course, individual features of the embodiments may be combined freely with one another, to the extent that this is technically feasible, without departing from the scope of the present invention.

LIST OF REFERENCE NUMERALS

1 Vehicle
2 Steering system
3 Steering handle
5 Actuator, force-feedback actuator
6 Windings
10 Safety system
101 Generating
102 Identifying
103 Enabling
104 Limiting
200 Processing device
201 Identification device
202 Enabling device
203 Limiting device The invention has been described in the preceding using various exemplary embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The mere fact that certain measures are recited in mutually different dependent claims or embodiments does not indicate that a combination of these measures cannot be used to advantage. Any reference signs in the claims should not be construed as limiting the scope.

What is claimed is:

1. A method for operating a steering system of a vehicle, wherein an actuator is provided for generating a moment at a steering handle of the vehicle, comprising:
  identifying a vehicle situation of the vehicle;
  enabling a maximum moment setting if the vehicle situation is identified as being one or more of a boarding and deboarding situation in order to brace the steering handle;
  enabling a limited moment setting, lower than the maximum moment setting, if the vehicle situation is identified as being driving operation of the vehicle; and
  generating the moment at the steering handle according to the maximum moment setting or according to the limited moment setting, respectively.

2. The method of claim 1, wherein the moment is generated up to the limited moment setting as a restoring moment, which counteracts a torque produced by a driver.

3. The method of claim 1, wherein the limited moment setting is such that a driver can override the limited moment, and the maximum moment setting is such that overriding is prevented.

4. The method of claim 1, wherein the maximum moment setting is at least 40 Nm or at least 60 Nm or at least 80 Nm, and the limited moment setting is at most 20 Nm or at most 10 Nm or at most 8 Nm.

5. The method of claim 1, wherein
an identification of the vehicle situation comprises at least one of the following:
detecting a deactivated readiness to drive of the vehicle;
detecting a deactivated ignition of an engine of the vehicle;
detecting a standstill of the vehicle based on a travel speed;
detecting an open position of one or more of a door and a hatch of the vehicle;
in each case in order to identify the vehicle situation as one or more of a boarding and deboarding situation.

6. The method of claim 1, wherein the actuator comprises redundant windings; wherein the maximum moment setting uses all windings to generate the moment; and wherein the limited moment setting uses only some of the windings to generate the moment.

7. The method of claim 1, wherein the steering system is designed as a steer-by-wire steering system.

8. A safety system for a steering system of a vehicle, comprising:
an actuator for generating a moment at a steering handle of the vehicle;
an electronic circuit, configured for:
identifying a vehicle situation of the vehicle;
enabling a maximum moment setting if the vehicle situation is identified as being one or more of a boarding and deboarding situation in order to brace the steering handle;
enabling a limited moment setting, lower than the maximum moment setting, if the vehicle situation is identified as being driving operation of the vehicle; and
controlling the actuator to generate the moment at the steering handle according to the maximum moment setting or according to the limited moment setting, respectively.

9. A non-transitory computer-readable medium comprising a program for operating a steering system of a vehicle, wherein the steering system comprises an actuator for generating a moment at a steering handle of the vehicle, wherein the program comprises commands which, when executed by a processor prompt the processor to:
identify a vehicle situation of the vehicle;
enabling a maximum moment setting if the vehicle situation is identified as being one or more of a boarding and deboarding situation in order to brace the steering handle;
enabling a limited moment setting, lower than the maximum moment setting, if the vehicle situation is identified as being driving operation of the vehicle; and
controlling the actuator to generate the moment at the steering handle according to the maximum moment setting or according to the limited moment setting, respectively.

10. The method of claim 1, wherein the moment is generated up to the limited moment setting as a restoring moment, which counteracts a torque produced by a driver in order to influence a sensation for the driver during steering of the vehicle.

11. The method of claim 2, wherein the limited moment setting is such that a driver can override the limited moment, and the maximum moment setting is such that overriding is prevented.

12. The method of claim 2, wherein the maximum moment setting is at least 40 Nm or at least 60 Nm or at least 80 Nm, and the limited moment setting is at most 20 Nm or at most 10 Nm or at most 8 Nm.

13. The method of claim 3, wherein the maximum moment setting is at least 40 Nm or at least 60 Nm or at least 80 Nm, and the limited moment setting is at most 20 Nm or at most 10 Nm or at most 8 Nm.

14. The method of claim 2, wherein
an identification of the vehicle situation comprises at least one of the following:
detecting a deactivated readiness to drive of the vehicle;
detecting a deactivated ignition of an engine of the vehicle;
detecting a standstill of the vehicle based on a travel speed;
detecting an open position of one or more of a door and a hatch of the vehicle;
in each case in order to identify the vehicle situation as one or more of a boarding and deboarding situation.

15. The method of claim 3, wherein
an identification of the vehicle situation comprises at least one of the following:
detecting a deactivated readiness to drive of the vehicle;
detecting a deactivated ignition of an engine of the vehicle;
detecting a standstill of the vehicle based on a travel speed;
detecting an open position of one or more of a door and a hatch of the vehicle;
in each case in order to identify the vehicle situation as one or more of a boarding and deboarding situation.

16. The method of claim 4, wherein
an identification of the vehicle situation comprises at least one of the following:
detecting a deactivated readiness to drive of the vehicle;
detecting a deactivated ignition of an engine of the vehicle;
detecting a standstill of the vehicle based on a travel speed;
detecting an open position of one or more of a door and a hatch of the vehicle;
in each case in order to identify the vehicle situation as one or more of a boarding and deboarding situation.

17. The method of claim 1, wherein the actuator comprises at least six windings; wherein the maximum moment setting uses all windings to generate the moment; and wherein and the limited moment setting uses only half of the windings to generate the moment.

18. The method of claim 2, wherein the actuator comprises redundant windings; wherein the maximum moment setting uses all windings to generate the moment; and wherein and the limited moment setting uses only some of the windings to generate the moment.

19. The method of claim 3, wherein the actuator comprises redundant windings; wherein the maximum moment setting uses all windings to generate the moment; and wherein the limited moment setting uses only some of the windings to generate the moment.

* * * * *